United States Patent
Nomiso et al.

(10) Patent No.: US 11,720,312 B2
(45) Date of Patent: Aug. 8, 2023

(54) MANAGE QUICKVIEW CONTENT FOR A MULTI-DISPLAY DEVICE

(71) Applicant: Motorola Mobility LLC, Chicago, IL (US)

(72) Inventors: Lúcia Satiko Nomiso, Campinas (BR); Luciano Bevilacqua Pereira da Silva, Rio de Janeiro (BR); Caio Luiz Leal Chagas do Nascimento, Campinas (BR); Amit Kumar Agrawal, Bangalore (IN); Kathryn Ellen Thomas, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/209,146

(22) Filed: Mar. 22, 2021

(65) Prior Publication Data

US 2022/0300234 A1    Sep. 22, 2022

(51) Int. Cl.
*G06V 20/00* (2022.01)
*G06F 3/14* (2006.01)
(Continued)

(52) U.S. Cl.
CPC ............ *G06F 3/1423* (2013.01); *G06V 20/00* (2022.01); *H04N 23/63* (2023.01); *G06V 2201/02* (2022.01); *H04M 1/72409* (2021.01)

(58) Field of Classification Search
CPC .. G06F 3/1423; G06V 20/00; G06V 2201/02; H04N 5/23293; H04M 1/72409
See application file for complete search history.

(56) References Cited

U.S. PATENT DOCUMENTS

| | | | |
|---|---|---|---|
| 10,645,292 B2* | 5/2020 | Park | G06F 1/1641 |
| 2014/0098004 A1* | 4/2014 | Ngo | A63B 71/0669 |
| | | | 345/1.3 |

(Continued)

FOREIGN PATENT DOCUMENTS

| | | |
|---|---|---|
| EP | 3779643 A1 | 2/2021 |
| KR | 20050023128 A | 3/2005 |

(Continued)

OTHER PUBLICATIONS

Agrawal, Amit Kumar, et al., "U.S. Application as Filed", U.S. Appl. No. 17/689,343, filed Mar. 8, 2022, 75 pages.

(Continued)

*Primary Examiner* — Jeff Piziali
(74) *Attorney, Agent, or Firm* — FIG. 1 Patents

(57) ABSTRACT

In aspects of managing quickview content for a multi-display device, the multi-display device has a primary display screen to display digital image content and a secondary display screen to display quickview content. The multi-display device implements a content control module to determine a context that indicates a characteristic of the digital image content displayed on the primary display screen. The content control module also determines the quickview content to display on the secondary display screen based on the context of the digital image content displayed on the primary display screen. The content control module then initiates displaying the quickview content on the secondary display screen. The content control module can also detect at least one individual in a region from which a secondary display screen of the multi-display device is viewable, and activate the secondary display screen in response to the individual being detected.

20 Claims, 11 Drawing Sheets

(51) Int. Cl.
*H04N 23/63* (2023.01)
*H04M 1/72409* (2021.01)

(56) References Cited

U.S. PATENT DOCUMENTS

| | | | |
|---|---|---|---|
| 2014/0310643 | A1 | 10/2014 | Karmanenko et al. |
| 2017/0094132 | A1* | 3/2017 | Miyata ............... H04N 5/23219 |
| 2017/0161006 | A1* | 6/2017 | Kwon .................... G06F 3/0483 |
| 2017/0199614 | A1* | 7/2017 | Lee ........................ G06F 3/0416 |
| 2017/0205923 | A1 | 7/2017 | Shim et al. |
| 2018/0198987 | A1* | 7/2018 | Park ........................ G06F 1/1652 |
| 2022/0070363 | A1 | 3/2022 | Machuca et al. |
| 2022/0198155 | A1 | 6/2022 | Olsen et al. |
| 2022/0300589 | A1 | 9/2022 | Kumar Agrawal et al. |

FOREIGN PATENT DOCUMENTS

| | | |
|---|---|---|
| KR | 20060101624 A | 9/2006 |
| WO | 2019153733 A1 | 8/2019 |

OTHER PUBLICATIONS

Desai, Rahul, et al., "U.S. Application as Filed", U.S. Appl. No. 17/689,358, filed Mar. 8, 2022, 75 pages.
U.S. Appl. No. 17/689,343, "Non-Final Office Action", U.S. Appl. No. 17/689,343, dated Sep. 29, 2022, 14 pages.
GB2203208.0, "Combined Search and Examination Report", GB Application No. GB2203208.0, dated Jul. 20, 2022, 8 pages.
Gwakseonmi, "Mobile Communication Device for Providing Translation Service on Location Information and Method Thereof", KR Application No. 10-2005-0023128, Mar. 21, 2005, 20 pages.
Plugable, "How to Use PowerPoint on Multiple Displays", YouTube video entitled: "How to Use PowerPoint on Multiple Displays," uploaded Mar. 30, 2020 by user "Plugable" [retrieved Aug. 10, 2022]. Retrieved from the Internet <https://www.youtube.com/watch?v=8BwNWxyxl6A>, Mar. 30, 2020, 4 pages.
U.S. Appl. No. 17/689,343, "Final Office Action", U.S. Appl. No. 17/689,343, dated Mar. 28, 2023, 14 pages.

* cited by examiner

MANAGE QUICKVIEW CONTENT FOR A MULTI-DISPLAY DEVICE

BACKGROUND

Devices such as smart devices, mobile devices (e.g., cellular phones, tablet devices), consumer electronics, and the like can be implemented for use in a wide range of industries and for a variety of different applications. Many of these devices can have multiple device configurations, such as dual-screen devices that have primary and secondary display screens, foldable devices that have a foldable display screen, flip phones that a user can flip between a closed configuration and an open configuration, and other mobile device configurations. Generally, a foldable device, a flip phone, and even some smartphones or tablet devices that do not fold or flip may also have more than one display screen and can be implemented as a multi-display device.

These multi-display devices are generally designed with a secondary display screen that is relatively smaller than the primary display screen of the device, and the secondary display screen may be utilized to display a notification or other type of information to the user of the device. For instance, the secondary display screen may serve as a notification screen that displays an indication of a new text message, an indication of a new email message that has been received, or an indication of an incoming phone call. Generally, user interactions and application display features are limited on the secondary display screen of many devices. In various situations, a user of a multi-display device may want to utilize the secondary display for increased functionality and display capabilities.

BRIEF DESCRIPTION OF THE DRAWINGS

Implementations of the techniques to manage quickview content for a multi-display device are described with reference to the following Figures. The same numbers may be used throughout to reference like features and components shown in the Figures.

DETAILED DESCRIPTION

Figure 1:
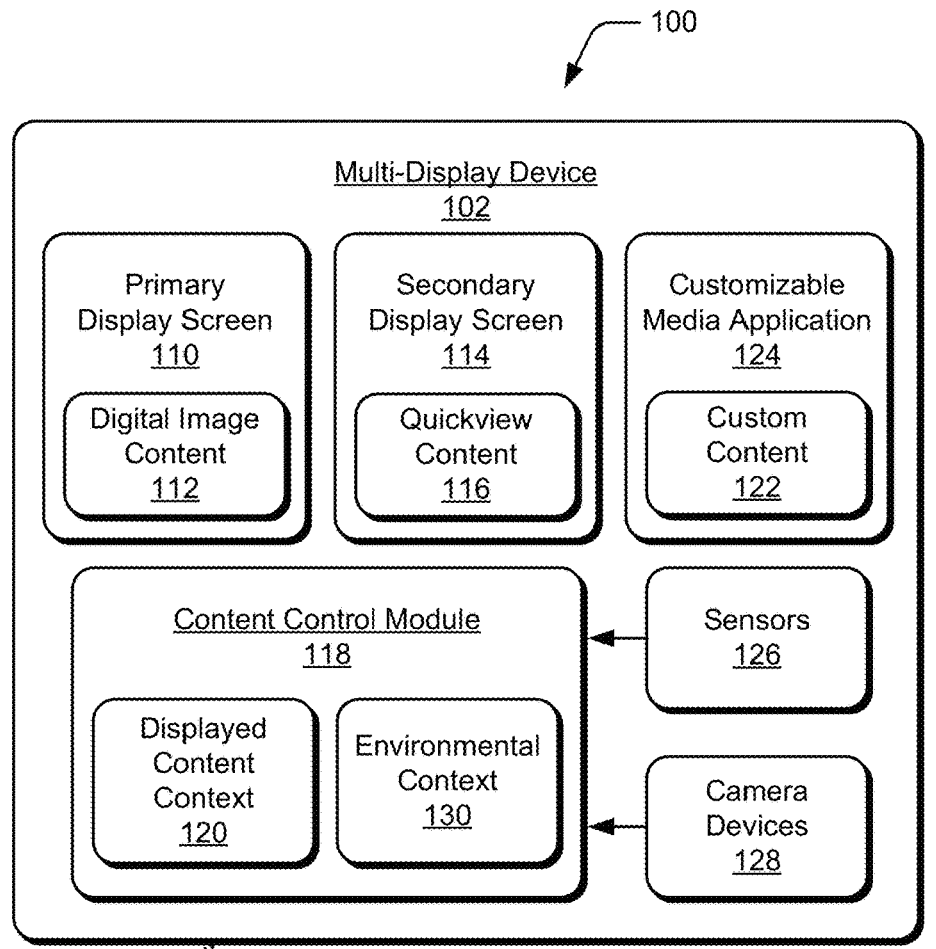
FIG. 1 illustrates an example device and features to manage quickview content for a multi-display device in accordance with one or more implementations as described herein.
Figure 1:
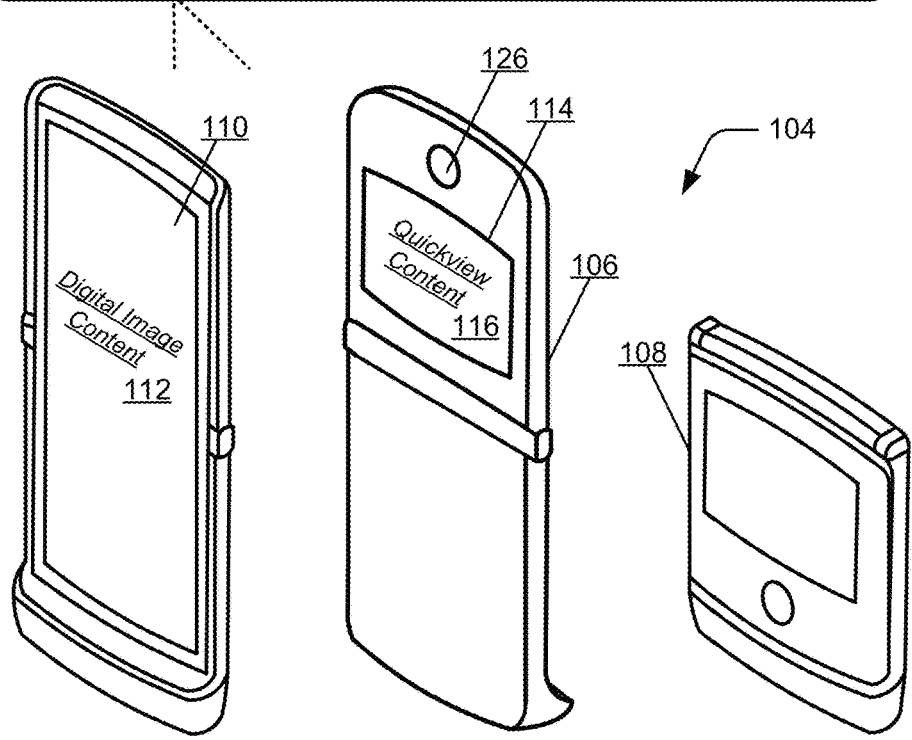

Implementations of managing quickview content for a multi-display device are described, and provide techniques that can be implemented by any type of multi-display device. Generally, a multi-display device may be a mobile phone (also commonly referred to as a "smartphone") that has a touchscreen primary display screen which can display any type of digital content and various media for viewing by a user of the device. The multi-display device has a secondary display screen, which can also display any type of digital content and various media for viewing by a user of the device. The features of managing quickview content for a multi-display device provide for expanded functionality and utility of the secondary display screen, and display quickview content based on the context of the primary display screen.

For example, a user of the multi-display device may be a participant in an important video conference call for work and a passerby may wish to speak with or engage the user. However, there is no indication to the passerby that the user is on the video conference call, or that the call is a high priority and the user likely does not wish to be interrupted. The user would have to either mute the call and inform the passerby of the context, or ignore the passerby altogether. In another example, the user of the multi-display device may be engaged in a social phone call with a family member, and the user may want to indicate to the passerby that it is okay to interrupt the call, or the user would want the passerby to stop and say hello to the family member on the phone call.

In aspects of managing quickview content for a multi-display device as described herein, a multi-display device implements a content control module that can determine a context, which indicates a characteristic of digital image content displayed on the primary display screen of the device. The content control module can then determine quickview content to display on the secondary display screen based on the context of the digital image content displayed on the primary display screen. Generally, the digital image content that is displayed on the primary display screen of the device is application user interfaces in which digital images or video is displayed, as well as user interactive controls, such as in a wireless communication interface, a camera viewfinder, a graphics editing user interface, or a web browser interface.

The quickview content is associated with the digital image content displayed on the primary display screen, and has a relatable context, indicating a characteristic of the digital image content. The quickview content may be any type of secondary digital image content, such as digital images (e.g., photos, pictures, video, graphics, GIFs, etc.), messages, text, and/or notifications that generally correspond to the digital image content displayed on the primary display screen of the multi-display device. In implementations, the quickview content can be preconfigured by a user, such as custom content generated by a customizable media application, which may be a graphics editing application via which a user can generate displayable graphics for display as the quickview content on the secondary display screen of the multi-display device. The content control module determines the quickview content to display, and then initiates to display the quickview content on the secondary display screen of the device. The content control module can also detect an individual in a region from which a secondary display screen of the multi-display device is viewable, and activate the secondary display screen in response to the individual being detected.

In another aspect of the described managing quickview content for a multi-display device, the content control module can detect an environmental context of the multi-display device based on sensor data obtained from one or more sensors, such as a context that indicates a characteristic of the environment or surroundings of the device. The content control module can also determine a context of the digital image content displayed on the primary display screen, and subsequently determine quickview content to display on a secondary display screen based on the environmental context and the context of the digital image content displayed on the primary display screen. Accordingly, the secondary display screen can display the quickview content based on both the environmental context of the multi-display device as well as based on the context of the digital image content displayed on the primary display screen.

In various described examples, the context (also referred to as the displayed content context) of the digital image content displayed on the primary display screen of the multi-display device may be determined as a photographic context, and the quickview content may then be a visual indication that the device is operating in a camera mode to capture a digital photograph or video content. The displayed content context may be determined as a wireless communication context, and the quickview content may then be a visual indication of a priority level of a wireless phone communication, or a wireless video communication. The displayed content context may be determined as an event viewing context, and the quickview content may then be an indication of how much time is remaining in the event or information about the event. The displayed content context may be determined as a crowd context, and the quickview content may then be a representation of an emotional status of a user of the multi-display device in relation to the crowd context.

While features and concepts of managing quickview content for a multi-display device can be implemented in any number of different devices, systems, environments, and/or configurations, implementations of managing quickview content for a multi-display device are described in the context of the following example devices, systems, and methods.

FIG. 1 illustrates an example 100 of techniques to manage quickview content for a multi-display device, such as implemented with a multi-display device 102. In this example 100, the multi-display device 102 may be a flip phone 104 that has different device configurations, such as a flip-open configuration 106 and a flip-closed configuration 108. Generally, the multi-display device 102 may be any type of an electronic and/or computing device implemented with various components, such as a processing system and memory, as well as any number and combination of different components as further described with reference to the example device shown in FIG. 11.

In this example, the multi-display device 102 includes a primary display screen 110 on which digital image content 112 can be displayed. The digital image content 112 may include any type of video, digital images (e.g., photos, pictures, video, animations, GIFs, etc.), graphics, media, user interfaces, and/or other types of displayable electronic data that is generated and/or downloaded by device applications executing on the device. The multi-display device 102 also includes a secondary display screen 114 on which quickview content 116 can be displayed. The quickview content 116 may be any type of secondary digital image content, such as digital images (e.g., photos, pictures, video, graphics, animations, GIFs, etc.), messages, text, and/or notifications that generally correspond to the digital image content 112 displayed on the primary display screen 110 of the multi-display device. In implementations, the quickview content 116 indicates a characteristic of the digital image content 112 that is displayed on the primary display screen 110 of the multi-display device. In configurations of a multi-display device 102, the primary display screen 110 and the secondary display screen 114 are generally on opposite sides of the device, and may be the same size, approximately the same size, or vary in different sizes. In this example, the secondary display screen 114 is relatively smaller than the primary display screen 110, such as illustrated with reference to the example flip phone 104.

The multi-display device 102 also includes a content control module 118 that implements features of managing quickview content for a multi-display device, as described herein. The content control module 118 may be implemented as a module that includes independent processing, memory, and logic components functioning as a computing and/or electronic device integrated with the multi-display device 102. Alternatively or in addition, the content control module 118 can be implemented as a software application, software module, or algorithm, such as computer-executable software instructions that are executable with a processor (e.g., with the processing system) of the multi-display device 102. As a software application, the content control module 118 can be stored on computer-readable storage memory (e.g., the memory of the device), or any other suitable memory device or electronic data storage implemented with the content control module 118. Alternatively or in addition, the content control module 118 may be implemented in firmware and/or at least partially in computer hardware. For example, at least part of the content control module 118 may be executable by a computer processor, and/or at least part of the content control module may be implemented in a hardware circuit.

In aspects of managing quickview content for a multi-display device, the content control module 118 is implemented to determine a displayed content context 120 that indicates a characteristic of the digital image content 112 displayed on the primary display screen 110. The displayed content context 120 may be predefined, for instance as configured by a user of the multi-display device 102. Alternatively or in addition, the displayed content context 120 may be automatically detected by the content control module 118. Examples of various contexts that correspond or are associated with the digital image content 112 displayed on the primary display screen 110 of the multi-display device 102 may include a wireless communication context, a photographic context, a crowd context, an event viewing context, or any other type of displayed content context 120 that indicates a characteristic of the digital image content 112 displayed on the primary display screen 110.

As further shown and described with reference to FIG. 2, the displayed content context 120 may be a wireless communication context, where the multi-display device 102 is being used for a wireless phone call or a wireless video communication. As further shown and described with reference to FIG. 3, the displayed content context 120 may be a photographic context, where the multi-display device 102 is operational in a camera mode to capture a digital photograph or video content. As further shown and described with reference to FIG. 4, the displayed content context 120 may be a crowd context, where the multi-display device 102 is located in a crowded bar, sporting event, arena, dinner party, concert venue, and the like. As further shown and described with reference to FIG. 5, the displayed content context 120 may be an event viewing context, where the primary display screen 110 is displaying an event, for instance a sporting event, award show, a movie, television show, or other video content from a streaming application.

The content control module 118 is further implemented to determine quickview content 116 for display on the secondary display screen 114 of the multi-display device 102 based on the displayed content context 120 of the digital image content 112 that is displayed on the primary display screen 110 of the device. The quickview content 116 may be preconfigured to correspond to a particular displayed content context 120. The quickview content 116 may also be determined automatically, without being preconfigured to correspond to a particular displayed content context 120. The quickview content 116 may also be custom content 122 obtained by the content control module 118, such as generated in a customizable media application 124 by a user of the multi-display device. As noted above with reference to the quickview content 116, the custom content 122 may generally be any type of digital image content, such as digital images (e.g., photos, pictures, video, graphics, animations, GIFs, etc.), messages, text, notifications, media, and/or other types of displayable electronic data. The multi-display device 102 can include various device applications, such as the customizable media application 124, which may be a graphics editing application via which a user can generate displayable graphics for display as the quickview content 116 on the secondary display screen 114 of the multi-display device.

Generally, the multi-display device 102 includes various device applications, such as a text application, email application, video service application, cellular communication application, music application, gaming application, web browser, file explorer application, graphics editing application, and/or any other of the many possible types of device applications. The device applications referred to herein also encompasses any content provider that communicates and provides content to the multi-display device, such as via a device application executing on the device. For example, a web browser application executing on the device may receive and surface various different types of media content and/or data from different web based services. Many device applications also have an associated user interface that is generated and displayed for user interaction and viewing, such as can be displayed as the digital image content 112 on the primary display screen 110 of the multi-display device.

In implementations, the quickview content 116 may further indicate the displayed content context 120 to an individual in a region proximate the multi-display device 102 from which the secondary display screen 114 is generally viewable. For instance, if the displayed content context 120 is a photographic context, the quickview content 116 may be a visual indication that the multi-display device 102 is operating in a camera mode to capture a digital photograph or video content. If the displayed content context 120 is a wireless communication context, the quickview content 116 may be a visual indication of a priority level of a wireless phone communication, or a wireless video communication. If the displayed content context 120 is an event viewing context, the quickview content 116 may be an indication of how much time is remaining in the event or information about the event. If the displayed content context 120 is a crowd context, the quickview content 116 may be a representation of an emotional status of a user of the multi-display device 102 in relation to the crowd context.

The content control module 118 is further implemented to initiate the display of the quickview content 116 on the secondary display screen 114 of the multi-display device 102. This may be done automatically, or responsive to a determination that one or more individuals are located within a proximal region of the multi-display device and from which the secondary display screen 114 is viewable. This determination can be based on sensor data received from one or more sensors 126 and/or camera devices 128 of the multi-display device that detect an individual within the region from which the secondary display screen 114 is viewable. The sensors 126 may include any type of a proximity sensor, an audio sensor, an imager of a camera device, a thermal sensor and/or any other type of device sensor that detects aspects of the environment around the multi-display device. Responsive to a determination that an individual is located in a region from which the secondary display screen 114 is viewable, the content control module 118 can activate the secondary display screen 114 of the multi-display device to display the quickview content 116. Alternatively, responsive to a determination that no individual is located in a region proximate the multi-display device from which the secondary display screen 114 is viewable, the content control module 118 can deactivate the secondary display screen.

In another aspect, the content control module 118 implemented by the multi-display device 102 can also detect an environmental context 130 that indicates a characteristic of the environment or surroundings of the multi-display device 102. For example, the content control module 118 receives the sensor data from the one or more sensors 126 or camera devices 128, and detects the environmental context 130 that indicates a characteristic of the environment or surroundings of the multi-display device. By way of example, the environmental context 130 can be detected as a crowd context, where the multi-display device 102 is located in a crowd of people, or as any other type of environmental context, such as a solo context, a date context, a group context, and the like. The content control module 118 can then determine the quickview content 116 to display on the secondary display screen 114 of the multi-display device based on the detected environmental context 130, for instance, either independently or in addition to the displayed content context 120 of the digital image content 112 displayed on the primary display screen 110 of the device.

Figure 2:
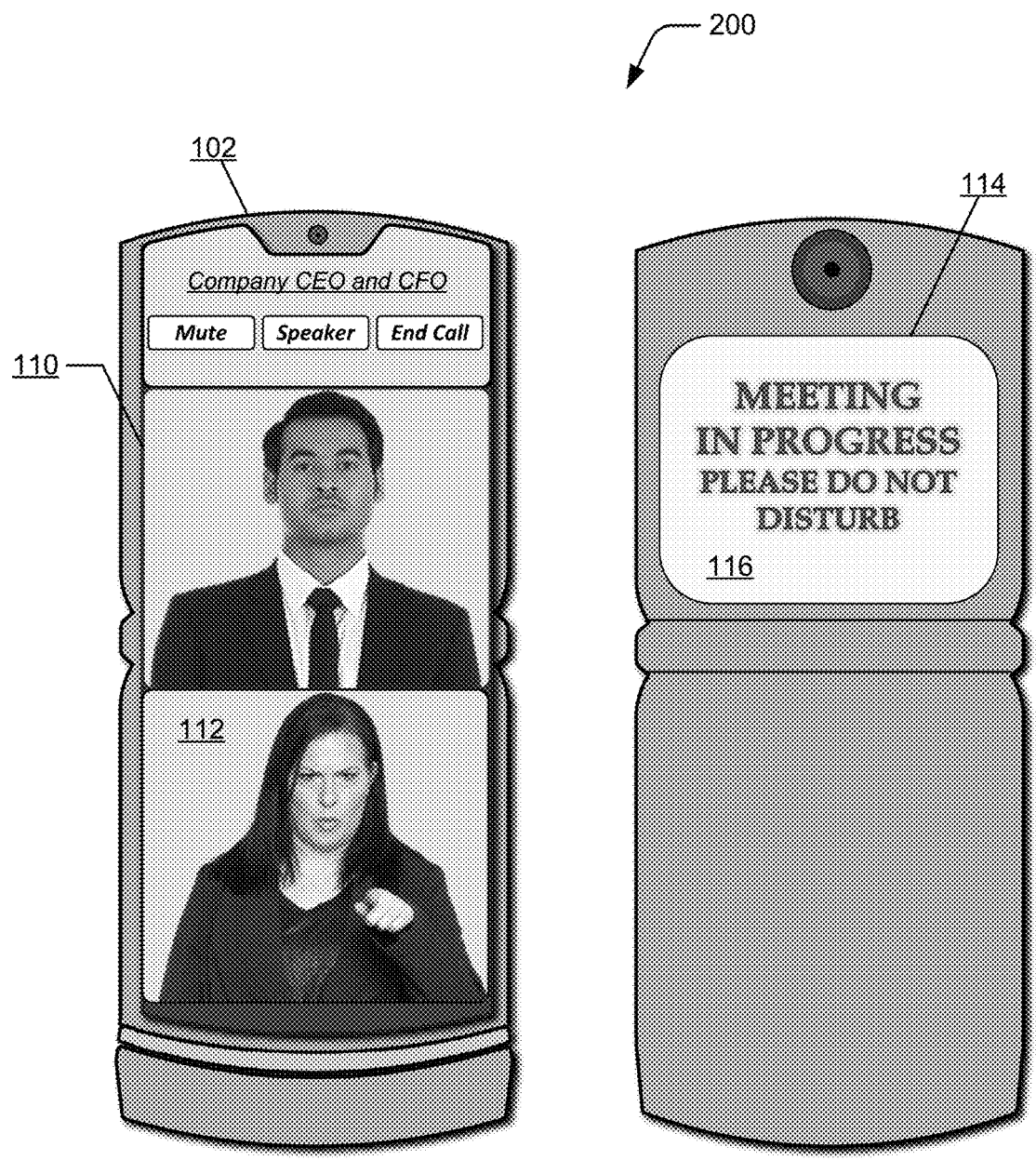
FIG. 2 illustrates an example of managing quickview content for a multi-display device in a wireless communication context in accordance with one or more implementations as described herein.

FIG. 2 illustrates an example 200 of techniques to manage quickview content for a multi-display device, where the displayed content context 120 of the digital image content 112 displayed on the primary display screen 110 of the device is determined by the content control module 118 to be a wireless communication context, such as a wireless phone call or a wireless video communication. In this example 200, the digital image content 112 displayed on the primary display screen 110 of the multi-display device 102 is a videocall (e.g., a wireless video communication) with "important" people, such as a company CEO and the company CFO. The content control module 118 can determine that the displayed content context 120 is a wireless communication context, such as the videocall, or any other wireless communication in the context of a phone call, video chat, video conference, web conference, webinar, and the like. The content control module 118 can determine the displayed content context 120 automatically, or the displayed content context 120 can be predefined. For instance, a user can predefine that anytime a particular video conferencing application is initiated and the video conferencing user interface is displayed on the primary display screen 110 of the multi-display device, this is an indication that the displayed content context 120 is a wireless communication context. Further, the user can predefine a priority level for certain contacts in a digital address listing. For example, the user can predefine that the "CEO" and the "CFO" contacts are "high priority" and thus the user does not want to be interrupted when on a phone call or video conference with these predefined contacts.

The content control module 118 can then determine the quickview content 116 to display on the secondary display screen 114 of the multi-display device 102 based on the displayed content context 120. The quickview content 116 can be determined automatically, e.g., a default setting for a wireless communication context that the quickview content 116 indicates the user does not wish to be disturbed. Alternatively, the quickview content 116 can be preconfigured, for instance user defined. The quickview content 116 can also be generated as the custom content 122 in the customizable media application 124. In this example, the quickview content 116 displayed on the secondary display screen 114 is a graphic that indicates that the user is in a meeting and does not wish to be disturbed. In this way, the user does not have to mute the call and inform a passerby not to disturb the call, or leave the passerby guessing as to the displayed content context 120.

Figure 3:
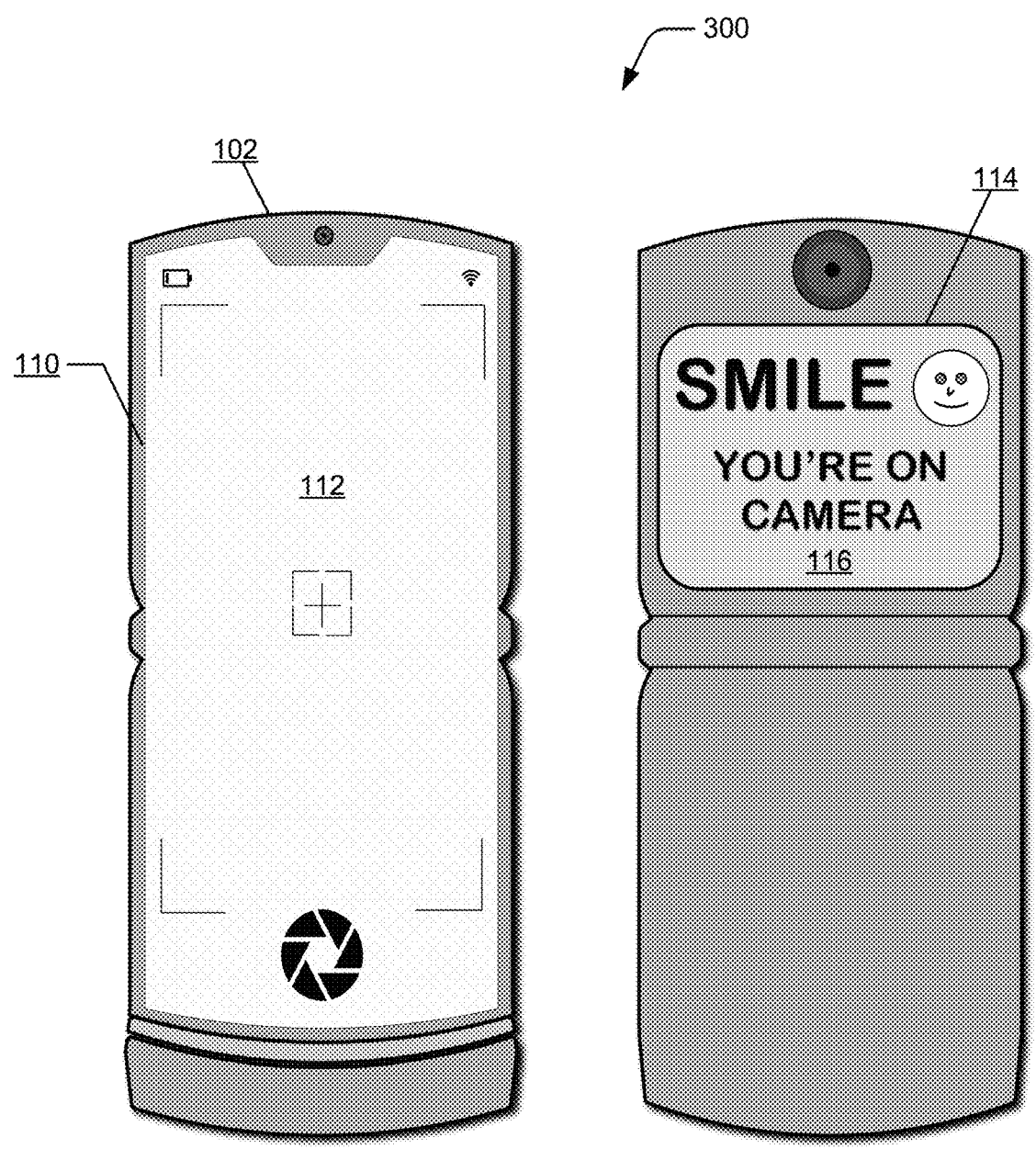
FIG. 3 illustrates an example of managing quickview content for a multi-display device in a photographic context in accordance with one or more implementations as described herein.

FIG. 3 illustrates an example 300 techniques to manage quickview content for a multi-display device, where the displayed content context 120 of the digital image content 112 displayed on the primary display screen 110 of the device is determined by the content control module 118 to be a photographic context, such as the multi-display device 102 being operational in a camera mode to capture a digital photograph or video content. In this example 300, the digital image content 112 displayed on the primary display screen 110 of the multi-display device 102 is a camera viewfinder via which a user of the device can capture digital images, video, and/or other digital media. The content control module 118 can determine that the displayed content context is a photographic context, such as for any type of image capturing operation, for instance a digital photograph, a video recording, a panorama image, time-lapse images, and/or any other types of image captures in a photographic context. The content control module 118 can determine the photographic context automatically or the photographic context can be predefined.

The content control module 118 can then determine the quickview content 116 to display on the secondary display screen 114 of the multi-display device 102 based on the photographic context. The quickview content 116 can be determined automatically, e.g., a default setting for a photographic context that the quickview content 116 indicates a digital image or video media is being captured, or is about to be captured, and that a detected individual in view of the camera should smile, or as an indication that the individual is in the shot or in focus. The quickview content 116 can also be preconfigured based on user preferences and/or may be generated as the custom content 122 in the customizable media application 124. In this example, the quickview content 116 displayed on the secondary display screen 114 is a graphic that indicates the multi-display device 102 is operating in a camera mode, and suggests or requests that an individual in view of the camera should smile. In this way, the multi-display device 102 can communicate specific information about the displayed content context 120 of the digital image content 112 displayed on the primary display screen 110 to an individual having his or her photograph taken.

Figure 4:
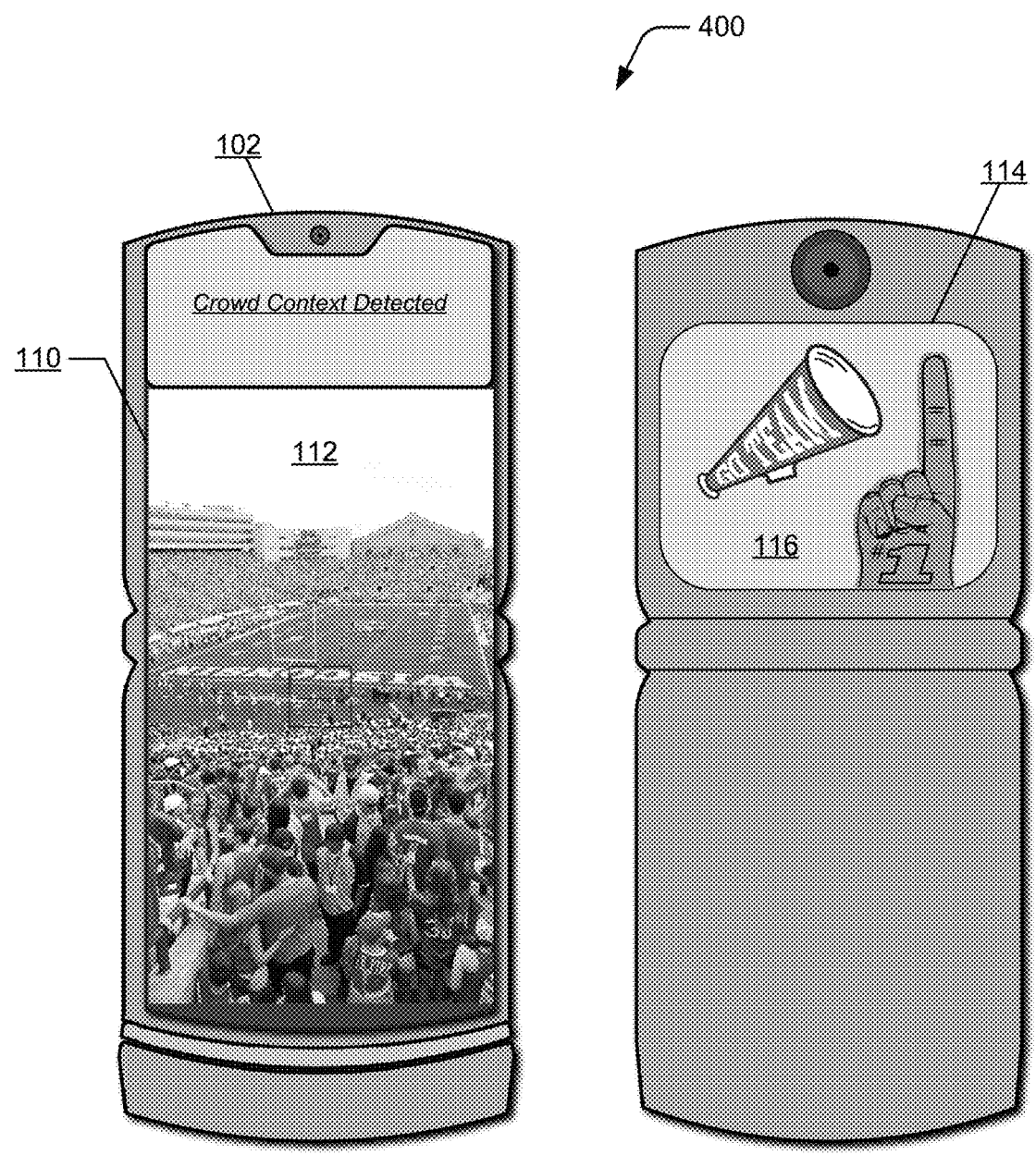
FIG. 4 illustrates an example of managing quickview content for a multi-display device in a crowd context in accordance with one or more implementations as described herein.

FIG. 4 illustrates an example 400 of techniques to manage quickview content for a multi-display device, where the displayed content context 120 of the digital image content 112 displayed on the primary display screen 110 of the device is determined to be a crowd context, such as when the multi-display device 102 is located in a crowded bar, at a sporting event, in an arena, at a dinner party, in a concert venue, and the like. In this example 400, the digital image content 112 displayed on the primary display screen 110 of the multi-display device 102 is a camera lens view indicating that the multi-display device is at a crowded sporting event. The content control module 118 can determine that the displayed content context 120 corresponds to a crowd context, such as based on the sensor data received from the one or more sensors 126 and/or the camera devices 128. Other indications may include a map of the venue displayed in a mapping application user interface, or based on an identifier of a Wi-Fi network that the multi-display device is connected to for service. The content control module 118 can determine the displayed content context 120 automatically, or the displayed content context 120 can be predefined. For instance, a user can indicate via an application running in the foreground of the primary display screen 110 that the user is in a crowd context.

The content control module 118 can then determine the quickview content 116 to display on the secondary display screen 114 of the multi-display device 102 based on the displayed content context 120 that indicates the crowd context. The quickview content 116 can be determined automatically, e.g., a default setting for a crowd context that the quickview content 116 is a representation of an emotional status of a user of the multi-display device 102 in relation to the crowd context. The quickview content 116 can also be preconfigured, for instance user defined. The quickview content 116 can be generated as the custom content 122 in the customizable media application 124. In this example, the quickview content 116 displayed on the secondary display screen 114 is a representation of an emotional status of a user of the multi-display device 102 in relation to the crowd context, for instance, excitement for the football game. The quickview content 116 could also be, for example, a message supporting a favorite team of the user, or a reaction to a certain play or call. In this way, the user can dynamically express an emotional status relating to the crowd context.

Figure 5:
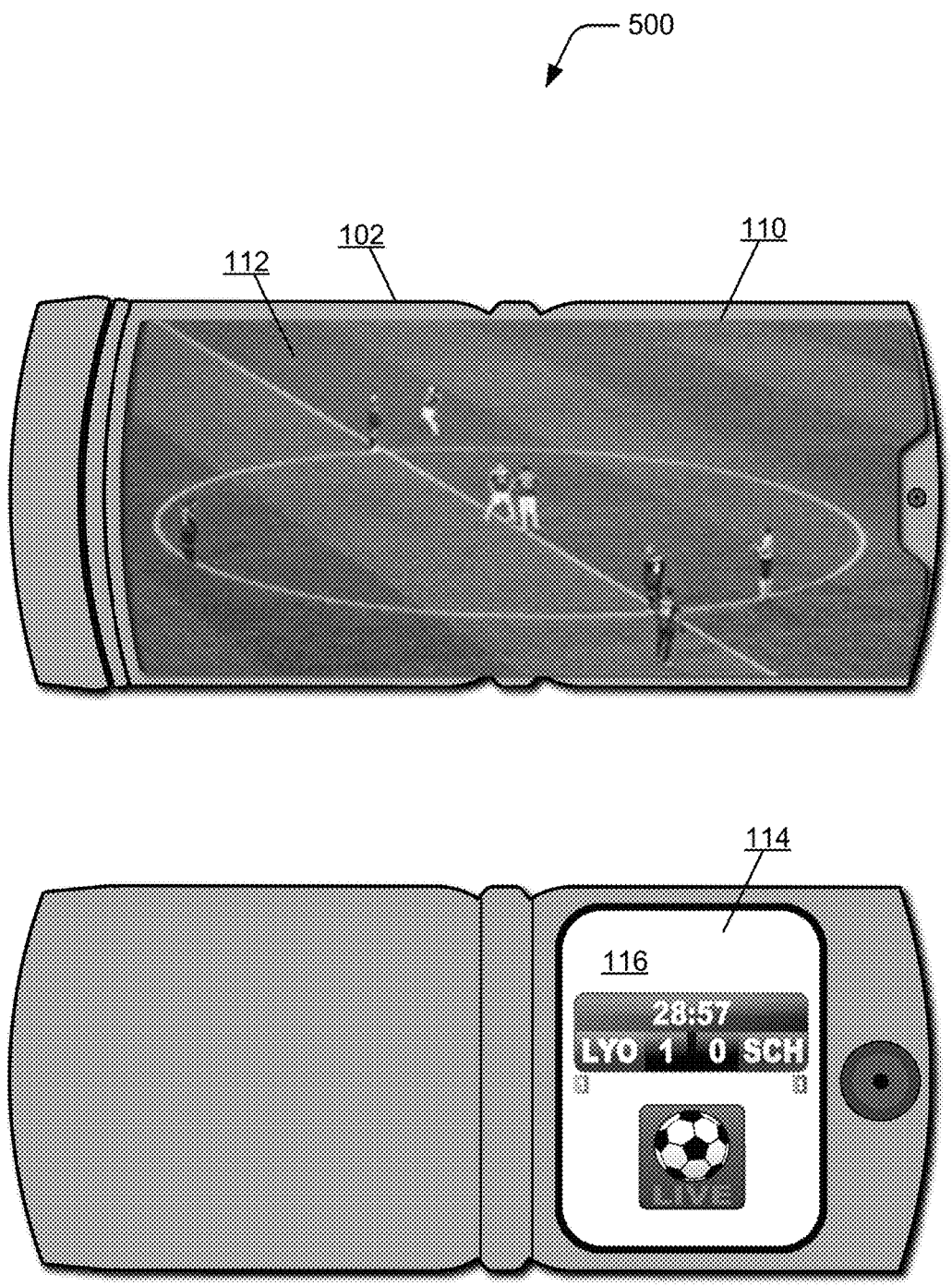
FIG. 5 illustrates an example of managing quickview content for a multi-display device in an event viewing context in accordance with one or more implementations as described herein.

FIG. 5 illustrates an example 500 of techniques to manage quickview content for a multi-display device, where the displayed content context 120 of the digital image content 112 displayed on the primary display screen 110 of the device is determined by the content control module 118 to be an event viewing context, such as when the primary display screen 110 is displaying an event, for instance a sporting event, award show, a movie, television show, or other video content from a streaming application. In this example 500, the digital image content 112 displayed on the primary display screen 110 of the multi-display device 102 is a live sporting event, in this example a soccer match. The content control module 118 can determine that the displayed content context 120 corresponds to an event viewing context, and the content control module 118 can determine the displayed content context 120 automatically, or the displayed content context 120 can be predefined.

The content control module 118 can then determine the quickview content 116 to display on the secondary display screen 114 of the multi-display device 102 based on the event viewing context. The quickview content 116 can be determined automatically, e.g., a default setting for an event viewing context that the quickview content 116 includes a visual indication of how much time remains in the event. The quickview content 116 can also be preconfigured, for instance user defined. The quickview content 116 can also be generated as the custom content 122 in the customizable media application 124. In this example, the quickview content 116 displayed on the secondary display screen 114 is a visual indication conveying information about the event in relation to the event viewing context, such as the score between the two teams in the soccer game displayed on the primary display screen 110, as well as the amount of time remaining in the game.

Figure 6:
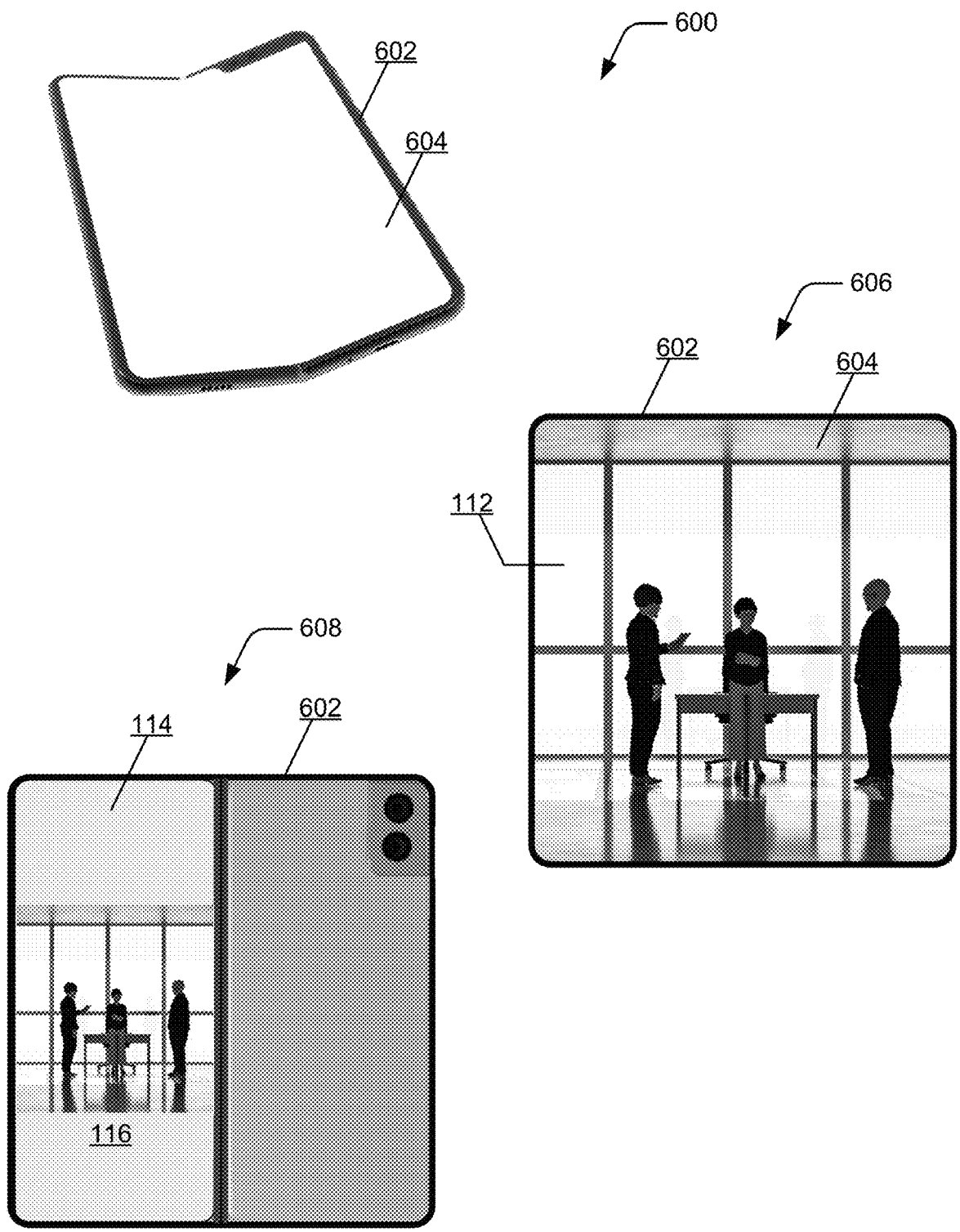
FIG. 6 illustrates another example device and features to manage quickview content for a multi-display device in accordance with one or more implementations as described herein.

FIG. 6 illustrates an example 600 of a device and features to manage quickview content for a multi-display device. In this example 600, a multi-display device 602 is a foldable device that has a foldable display screen 604, which accommodates different device configurations, such as an open configuration 606 and a folded closed configuration. The foldable display screen 604 is an example of the primary display screen 110 of the device, which also includes the secondary display screen 114, as shown at 608. In the open configuration 606, the digital image content 112 is displayed on the foldable display screen 604 (e.g., the primary display screen 110) of the device, and the content control module 118 can determine the displayed content context 120 of the digital image content 112. The content control module 118 can then determine the quickview content 116 to display on the secondary display screen 114 of the multi-display device 602 based on an event viewing context, such as a shared viewing context. In this example, the quickview content 116 displayed on the secondary display screen 114 is the same as the digital image content 112 displayed on the primary display screen of the device. Notably, a user of the multi-display device 602 may be watching a video or other media on the foldable display screen 604 and also want to share the video or media with another person who can view the same content on the secondary display screen 114 of the device.

Example methods 700, 800, 900, and 1000 are described with reference to respective FIGS. 7-10 in accordance with implementations of managing quickview content for a multi-display device. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 7:
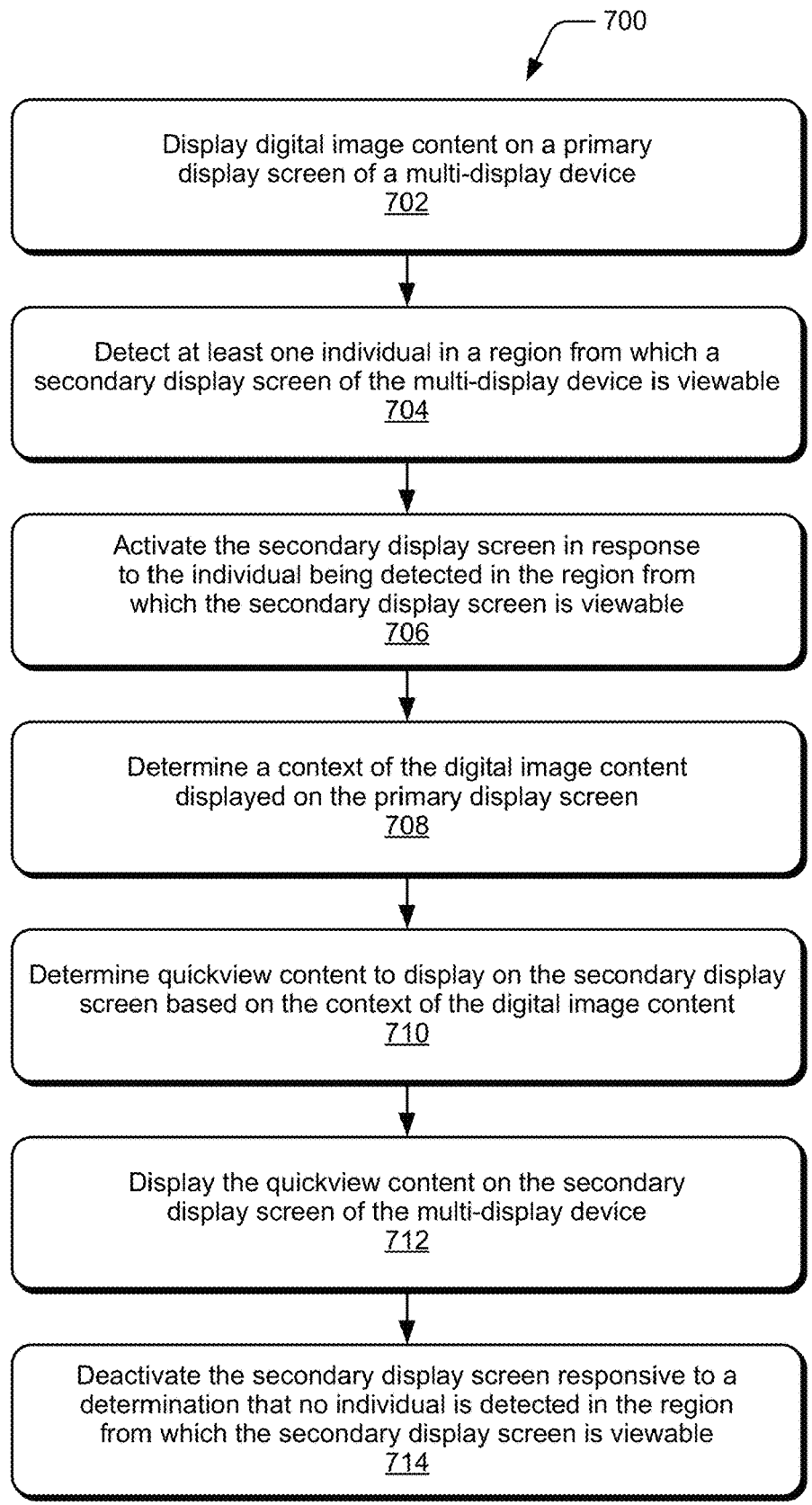
FIGS. 7-10 illustrate example methods of managing quickview content for a multi-display device in accordance with one or more implementations of the techniques described herein.

FIG. 7 illustrates example method(s) 700 of managing quickview content for a multi-display device, and is generally described with reference to a content control module implemented by the multi-display device. The order in which the method is described is not intended to be construed as a limitation, and any number or combination of the described method operations can be performed in any order to perform a method, or an alternate method.

At 702, digital image content is displayed on a primary display screen of a multi-display device. For example, the multi-display device 102 displays digital image content 112 on the primary display screen 110 of the device. The digital image content 112 can include any type of video, digital images, graphics, media, user interfaces, and/or other types of displayable electronic data that is generated and/or downloaded by device applications executing on the device.

At 704, at least one individual is detected in a region from which a secondary display screen of the multi-display device is viewable. For example, the content control module 118 implemented by the multi-display device 102 receives sensor data from one or more sensors 126 or camera devices 128 and detects at least one individual in a region proximate the multi-display device 102 from which the secondary display screen 114 of the device is viewable. The sensors 126 may include any type of a proximity sensor, an audio sensor, an imager of a camera device, a thermal sensor, and/or any other type of device sensor that detects aspects of the environment around the multi-display device.

At 706, the secondary display screen is activated in response to the individual being detected in the region from which the secondary display screen is viewable. For example, the content control module 118 implemented by the multi-display device 102 activates the secondary display screen 114 of the device responsive to an individual being detected in a region proximate the device from which the secondary display screen 114 is viewable.

At 708, a context of the digital image content that is displayed on the primary display screen is determined. For example, the content control module 118 implemented by the multi-display device 102 determines the displayed content context 120 of the digital image content 112 that is displayed on the primary display screen 110 of the device. The displayed content context 120 indicates a characteristic of the digital image content 112 displayed on the primary display screen 110, and may be predefined as configured by a user of the multi-display device. An example of the displayed content context 120 is a photographic context, where the multi-display device 102 is operational in a camera mode to capture a digital photograph or video content. In another example, the displayed content context 120 of the digital image content 112 displayed on the primary display screen 110 is an event viewing context, where the primary display screen 110 displays an event, such as a sporting event, an award show, a movie, a television show, or other video content from a media streaming application. As another example, the displayed content context 120 of the digital image content 112 displayed on the primary display screen 110 is a wireless communication context, where the multi-display device 102 is being used for a wireless phone call or a wireless video communication.

At 710, quickview content to display on the secondary display screen is determined based on the context of the digital image content displayed on the primary display screen. For example, the content control module 118 implemented by the multi-display device 102 determines the quickview content 116 to display on the secondary display screen 114 of the device based on the displayed content context 120 of the digital image content 112 that is displayed on the primary display screen 110 of the device. In implementations, the quickview content 116 is preconfigured to correspond to the digital image content, and the quickview content 116 can be obtained as custom content 122 generated in a customizable media application 124. The quickview content 116 can indicate a characteristic of the digital image content 112, such as in a photographic context, the quickview content 116 may be a visual indication that the multi-display device 102 is in a camera mode to capture a digital photograph or video content. In an example of the displayed content context 120 being determined as an event viewing context, the quickview content 116 may be a visual indication conveying information about an event in relation to the event viewing context. In an example of the displayed content context 120 being determined as a wireless communication context, the quickview content 116 may be a visual indication of a priority level of the wireless communication or a depiction of who the wireless communication is with.

At 712, the quickview content is displayed on the secondary display screen of the multi-display device. For example, the content control module 118 implemented by the multi display device 102 initiates to display the quickview content 116 on the secondary display screen 114 of the device. At 714, the secondary display screen is deactivated responsive to a determination that no individual is detected in the region from which the secondary display screen is viewable. For example, the content control module 118 implemented by the multi-display device 102 can also deactivate the secondary display screen 114 of the multi-display device 102 responsive to a determination that no individual is detected in a region proximate the device from which the secondary display screen 114 is viewable.

Figure 8:
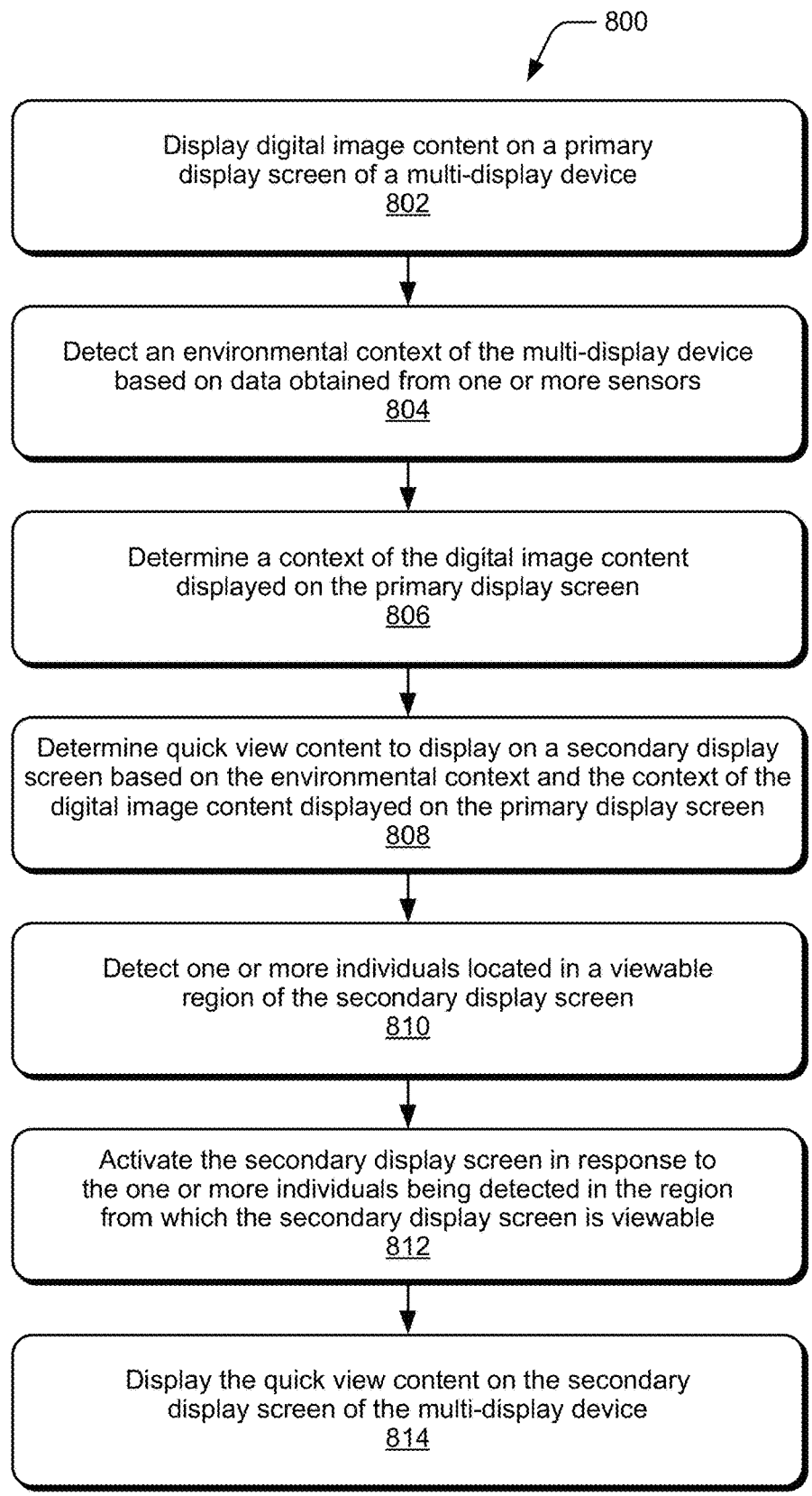

FIG. 8 illustrates example method(s) 800 of managing quickview content for a multi-display device, and is generally described with reference to a content control module implemented by the multi-display device. The order in which the method is described is not intended to be construed as a limitation, and any number or combination of the described method operations can be performed in any order to perform a method, or an alternate method.

At 802, digital image content is displayed on a primary display screen of a multi-display device. For example, the multi-display device 102 displays digital image content 112 on the primary display screen 110 of the device. The digital image content 112 may include any type of video, digital images, graphics, media, user interfaces, and/or other types of displayable electronic data that is generated and/or downloaded by device applications executing on the device.

At 804, an environmental context of the multi-display device is detected based on data obtained from one or more sensors. For example, the content control module 118 implemented by the multi-display device 102 receives sensor data from one or more sensors 126 or camera devices 128 and detects the environmental context 130 that indicates a characteristic of the environment or surroundings of the multi-display device. By way of example and without limitation, the environmental context 130 can be detected as a crowd context, where the multi-display device 102 is located in a crowd of people, or as any other type of environmental context, such as a solo context, a date context, a group context, and the like.

At 806, a context of the digital image content displayed on the primary display screen of the multi-display device is determined. For example, the content control module 118 implemented by the multi-display device 102 determines the displayed content context 120 of the digital image content 112 that is displayed on the primary display screen 110 of the device. The displayed content context 120 indicates a characteristic of the digital image content 112 displayed on the primary display screen 110, and may be predefined as configured by a user of the multi-display device. In an example, the displayed content context 120 of the digital image content 112 displayed on the primary display screen 110 is content generated from a device application, such as the customizable media application 124, a customizable media sharing application, or other type of graphics editing application.

At 808, quickview content to display on a secondary display screen of the multi-display device is determined based on the environmental context and the context of the digital image content displayed on the primary display screen. For example, the content control module 118 implemented by the multi-display device 102 determines the quickview content 116 to display on the secondary display screen 114 of the device based on the environmental context 130 and the displayed content context 120 of the digital image content 112 displayed on the primary display screen 110 of the device. For instance, based on the determination that the environmental context 130 is a crowd context, the quickview content 116 that is displayed on the secondary display screen 114 of the multi-display device 102 may be a representation of an emotional status of the user of the device in relation to the crowd context.

At 810, one or more individuals located in a viewable region of the secondary display screen are detected. For example, the content control module 118 implemented by the multi-display device 102 receives sensor data from one or more sensors 126 or camera devices 128 and detects one or more individuals in a region proximate the multi-display device 102 from which the secondary display screen 114 of the device is viewable. The sensors 126 may include any type of a proximity sensor, an audio sensor, an imager of a camera device, a thermal sensor, and/or any other type of device sensor that detects aspects of the environment around the multi-display device.

At 812, the secondary display screen is activated in response to the one or more individuals being detected in the region from which the secondary display screen is viewable. For example, the content control module 118 implemented by the multi-display device 102 activates the secondary display screen 114 of the device responsive to an individual being detected in a region proximate the device from which the secondary display screen 114 is viewable.

At 814, the quickview content is displayed on the secondary display screen of the multi-display device. For example, the content control module 118 implemented by the multi-display device 102 initiates to display the quickview content 116 on the secondary display screen 114 of the device. For an environmental context 130 determined as a crowd context, the quickview content 116 displayed on the secondary display screen 114 of the multi-display device may be customized media or the custom content 122 obtained from the customizable media application 124.

Figure 9:
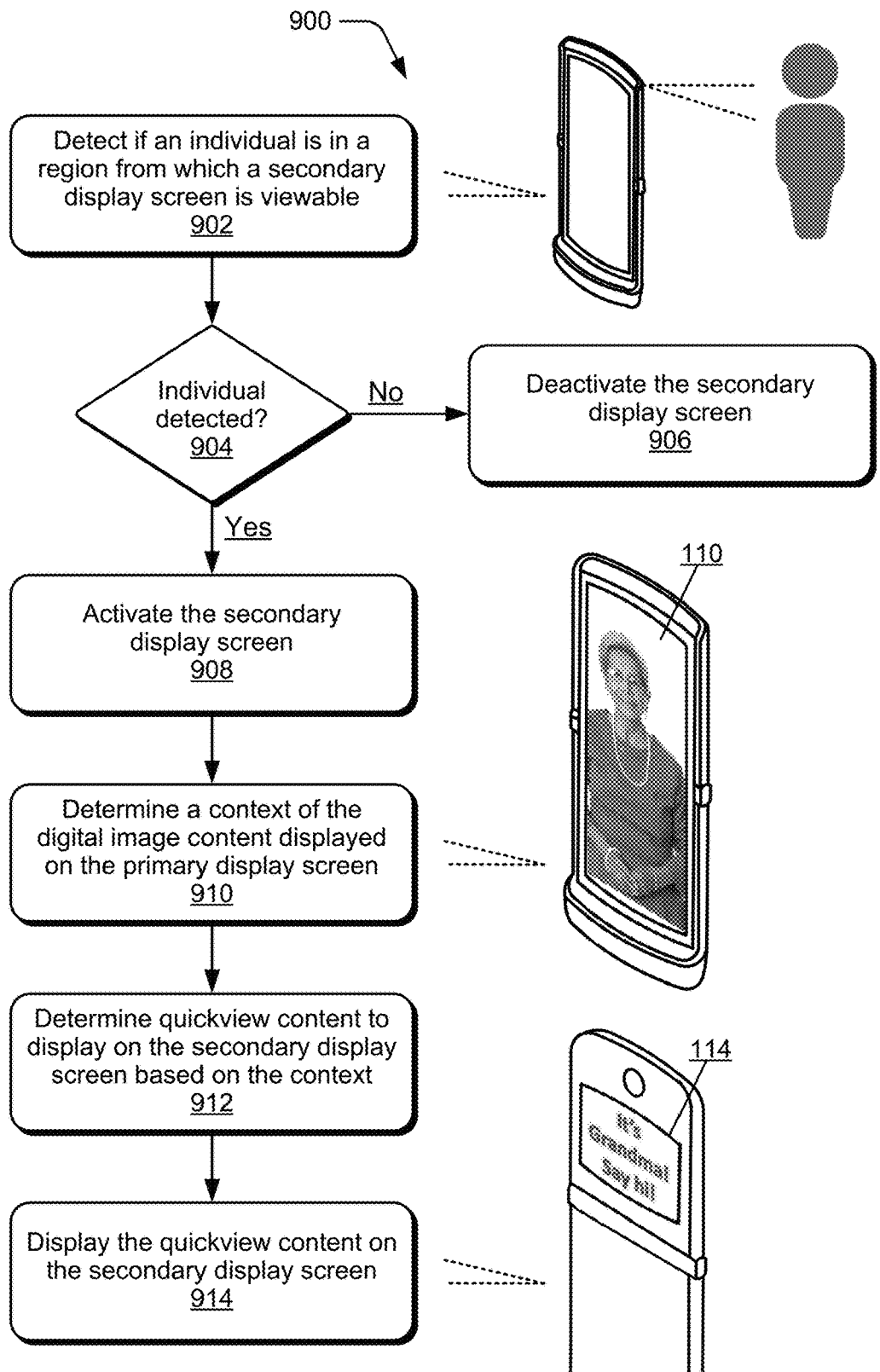

FIG. 9 illustrates example method(s) 900 of managing quickview content for a multi-display device, and is generally described with reference to a content control module implemented by the multi-display device. The order in which the method is described is not intended to be construed as a limitation, and any number or combination of the described method operations can be performed in any order to perform a method, or an alternate method.

At 902, the multi-display device 102 detects if an individual is in a region from which a secondary display screen 114 of the multi-display device 102 is viewable. For example, the content control module 118 receives sensor data from the one or more sensors 126 or camera devices 128 from which an individual in a region proximate the multi-display device 102 can be detected. The sensors 126 may include any type of a proximity sensor, an audio sensor, an imager of a camera device, a thermal sensor, and/or any other type of device sensor that detects aspects of the environment around the multi-display device.

At 904, a determination is made as to whether an individual in detected in a region from which the secondary display screen 114 of the multi-display device 102 is viewable. For example, the content control module 118 detects, from the sensor data, if an individual is in a region proximate the multi-display device 102 from which the secondary display screen 114 is viewable. If no individual is detected in the region from which the secondary display screen 114 of the device is viewable (i.e., "No" from 904), then the secondary display screen 114 is deactivated at 906. Alternatively, if an individual is detected in the region from which the secondary display screen 114 of the device is viewable (i.e., "Yes" from 904), then the secondary display screen 114 is activated at 908.

At 910, a displayed content context 120 of the digital image content 112 displayed on the primary display screen 110 of the multi-display device 102 is determined. In this example method 900, the displayed content context 120 of the digital image content 112 displayed on the primary display screen 110 of the multi-display device 102 is a wireless communication context, such as a video chat with a family member shown on the primary display screen 110. The displayed content context 120 can be determined automatically, or the displayed content context 120 can be predefined. Further, a user of the multi-display device 102 can predefine an associated displayed content context 120 for certain contacts. In this example method 900, a user of the multi-display device 102 has predefined a "Grandma" contact as a family member and thus, the user is amenable with being interrupted while on a call with Grandma.

At 912, quickview content 116 is determined to display on the secondary display screen 114 of the multi-display device 102 based on the displayed content context 120 of the digital image content 112 displayed on the primary display screen 110 of the device. In this example method 900, the determined quickview content 116 is an indication to the detected individual that the user of the multi-display device 102 is talking to Grandma, and that the individual is welcome to say hello. The quickview content 116 may be customized media obtained from a customizable media sharing application, for instance a message graphic for display to convey "It's Grandma! Say Hi." At 914, the determined quickview content 116 is then displayed on the secondary display screen 114 of the multi-display device 102, which is viewable by the detected individual who is in the region proximate the device and can likely view the secondary display screen of the device.

Figure 10:
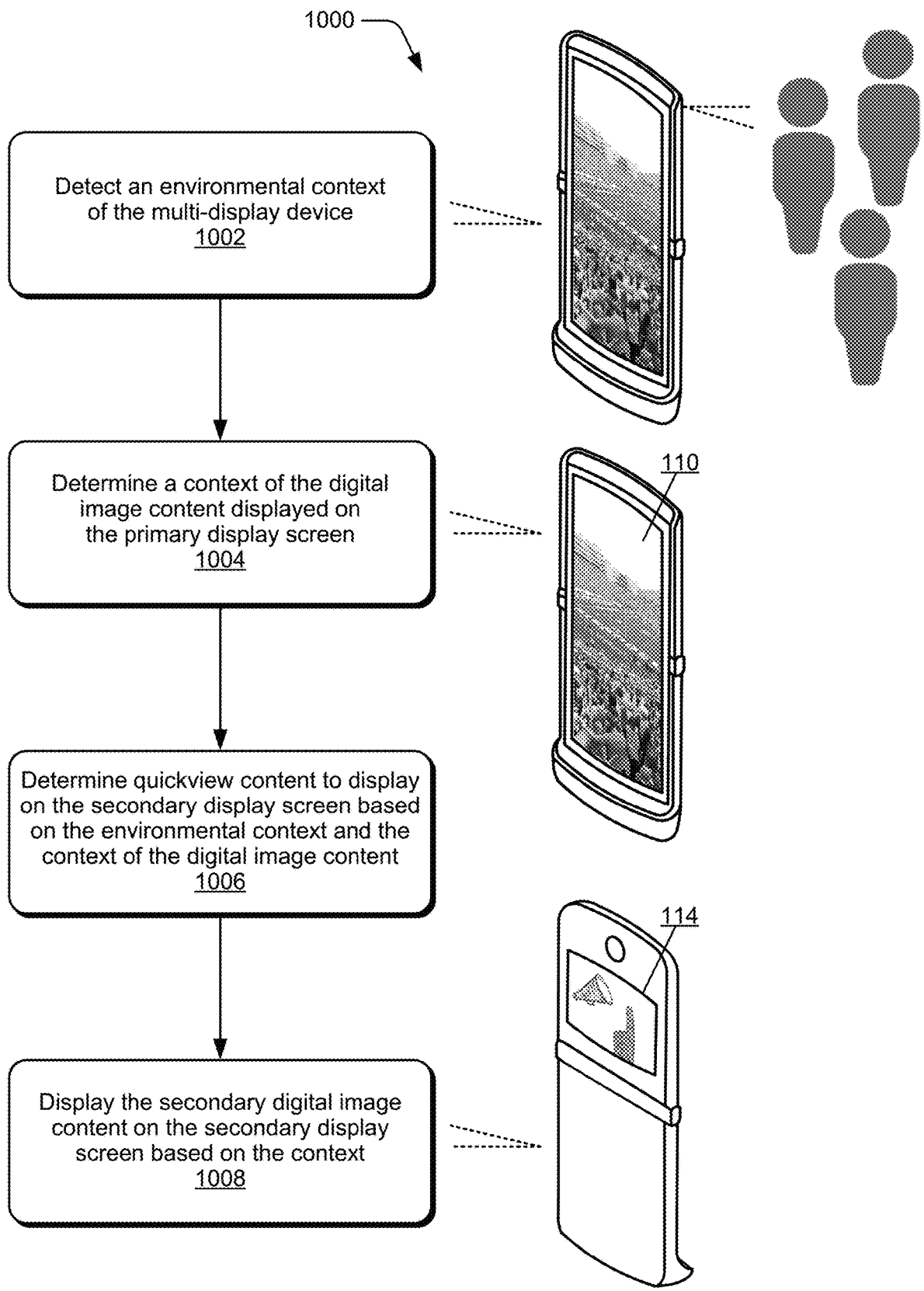

FIG. 10 illustrates example method(s) 1000 of managing quickview content for a multi-display device, and is generally described with reference to a content control module implemented by the multi-display device. The order in which the method is described is not intended to be construed as a limitation, and any number or combination of the described method operations can be performed in any order to perform a method, or an alternate method.

At 1002, the multi-display device 102 detects an environmental context 130 of the multi-display device 102. For example, the content control module 118 receives sensor data from the one or more sensors 126 or camera devices 128 from which the environmental context 130 of the region proximate and/or surrounding the multi-display device 102 is detected. The sensors 126 may include any type of a proximity sensor, an audio sensor, an imager of a camera device, a thermal sensor, and/or any other type of device sensor that detects aspects of the environment around the multi-display device. In this example method 1000, the determined environmental context 130 is a crowd context, where the multi-display device 102 is located in a crowd of people, such as at a sporting event or in a concert venue.

At 1004, a displayed content context 120 of the digital image content 112 displayed on the primary display screen 110 of the multi-display device 102 is determined. In this example method 1000, the digital image content 112 displayed on the primary display screen 110 of the multi-display device 102 is a camera lens view indicating that the device is located in a crowd at a sporting event. The content control module 118 is implemented to determine that the context of the digital image content 112 displayed on the primary display screen 110 of the device corresponds to a crowd context.

At 1006, quickview content 116 is determined to display on the secondary display screen 114 of the multi-display device 102 based on the environmental context 130 of the device and the displayed content context 120 of the digital image content 112 displayed on the primary display screen 110 of the device. In this example method 1000, both the environmental context 130 of the multi-display device 102 and the displayed content context 120 of the digital image content 112 displayed on the primary display screen 110 correspond to the crowd context. Thus, a user of the multi-display device 102 may wish to express an emotional status, react to the event, or display a message supporting the user's team. In this example, the determined quickview content 116 is a representation of an emotional status of a user of the multi-display device 102 in relation to the crowd context, for instance, excitement for the sporting event. At 1008, the determined quickview content 116 is displayed on the secondary display screen 114 of the multi display device 102, which is viewable by other individuals in the crowd who are in a position to likely view the secondary display screen of the device.

Figure 11:
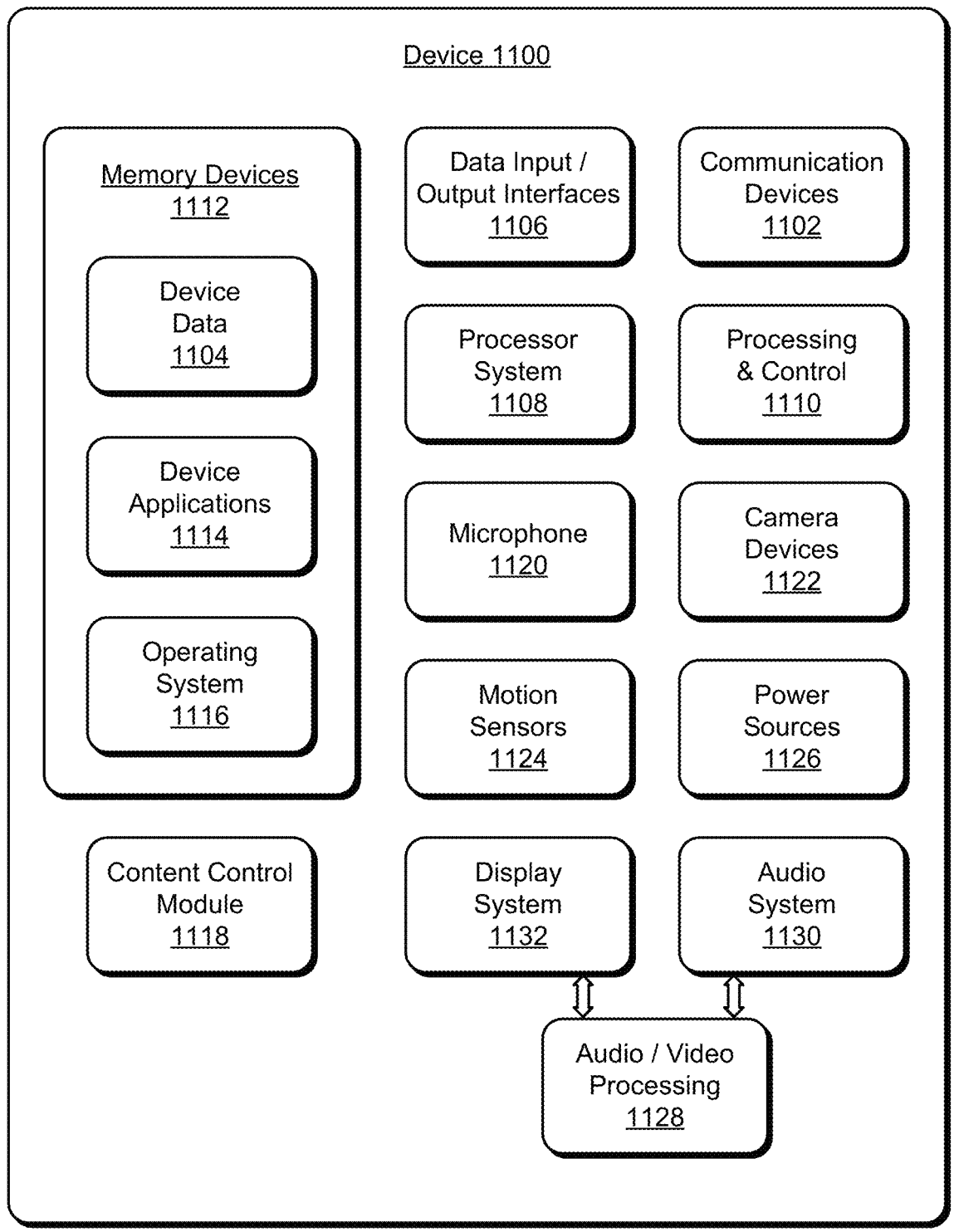
FIG. 11 illustrates various components of an example device that can be used to implement the techniques of managing quickview content for a multi-display device as described herein.

FIG. 11 illustrates various components of an example device 1100, which can implement aspects of the techniques and features to manage quickview content for a multi-display device, as described herein. The example device 1100 can be implemented as any of the devices described with reference to the previous FIGS. 1-10, such as any type of a multi-display device, mobile device, mobile phone, flip phone, client device, companion device, paired device, display device, tablet, computing, communication, entertainment, gaming, media playback, and/or any other type of computing and/or electronic device. For example, the multi-display device 102 described with reference to FIGS. 1-10, as well as the multi-display device 602 describe with reference to FIG. 6, may be implemented as the example device 1100.

The example device 1100 can include various, different communication devices 1102 that enable wired and/or wireless communication of device data 1104 with other devices. The device data 1104 can include any of the various devices data and content that is generated, processed, determined, received, stored, and/or communicated from one computing device to another. Generally, the device data 1104 can include any form of audio, video, image, graphics, and/or electronic data that is generated by applications executing on a device. The communication devices 1102 can also include transceivers for cellular phone communication and/or for any type of network data communication.

The example device 1100 can also include various, different types of data input/output (I/O) interfaces 1106, such as data network interfaces that provide connection and/or communication links between the devices, data networks, and other devices. The I/O interfaces 1106 can be used to couple the device to any type of components, peripherals, and/or accessory devices, such as a computer input device that may be integrated with the example device 1100. The I/O interfaces 1106 may also include data input ports via which any type of data, information, media content, communications, messages, and/or inputs can be received, such as user inputs to the device, as well as any type of audio, video, image, graphics, and/or electronic data received from any content and/or data source.

The example device 1100 includes a processor system 1108 of one or more processors (e.g., any of microprocessors, controllers, and the like) and/or a processor and memory system implemented as a system-on-chip (SoC) that processes computer-executable instructions. The processor system may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that may be implemented in connection with processing and control circuits, which are generally identified at 1110. The example device 1100 may also include any type of a system bus or other data and command transfer system that couples the various components within the device. A system bus can include any one or combination of different bus structures and architectures, as well as control and data lines.

The example device 1100 also includes memory and/or memory devices 1112 (e.g., computer-readable storage memory) that enable data storage, such as data storage devices implemented in hardware that can be accessed by a computing device, and that provide persistent storage of data and executable instructions (e.g., software applications, programs, functions, and the like). Examples of the memory devices 1112 include volatile memory and non-volatile memory, fixed and removable media devices, and any suitable memory device or electronic data storage that maintains data for computing device access. The memory devices 1112 can include various implementations of random-access memory (RAM), read-only memory (ROM), flash memory, and other types of storage media in various memory device configurations. The example device 1100 may also include a mass storage media device.

The memory devices 1112 (e.g., as computer-readable storage memory) provide data storage mechanisms, such as to store the device data 1104, other types of information and/or electronic data, and various device applications 1114 (e.g., software applications and/or modules). For example, an operating system 1116 can be maintained as software instructions with a memory device 1112 and executed by the processor system 1108 as a software application. The device applications 1114 may also include a device manager, such as any form of a control application, software application, signal-processing and control module, code that is specific to a particular device, a hardware abstraction layer for a particular device, and so on.

In this example, the device 1100 includes a content control module 1118 that implements various aspects of the described features and techniques to manage quickview content for a multi-display device. The content control module 1118 can be implemented with hardware components and/or in software as one of the device applications 1114, such as when the example device 1100 is implemented as the multi-display device 102 described with reference to FIGS. 1-10. An example of the content control module 1118 includes the content control module 118 that is implemented by the multi-display device 102, such as a software application and/or as hardware components in the multi-display device 102. In implementations, the content control module 118 may include independent processing, memory, and logic components as a computing and/or electronic device integrated with the example device 1100.

The example device 1100 can also include a microphone 1120 and/or camera devices 1122, as well as motion sensors 1124, such as may be implemented as components of an inertial measurement unit (IMU). The motion sensors 1124 can be implemented with various sensors, such as a gyroscope, an accelerometer, and/or other types of motion sensors to sense motion of the device. The motion sensors 1124 can generate sensor data vectors having three-dimensional parameters (e.g., rotational vectors in x, y, and z-axis coordinates) indicating location, position, acceleration, rotational speed, and/or orientation of the device. The example device 1100 can also include one or more power sources 1126, such as when the device is implemented as a multi-display device 102, the multi-display device 602, and/or as a mobile device. The power sources may include a charging and/or power system, and can be implemented as a flexible strip battery, a rechargeable battery, a charged super-capacitor, and/or any other type of active or passive power source.

The example device 1100 can also include an audio and/or video processing system 1128 that generates audio data for an audio system 1130 and/or generates display data for a display system 1132. The audio system and/or the display system may include any types of devices or modules that generate, process, display, and/or otherwise render audio, video, display, and/or image data. Display data and audio signals can be communicated to an audio component and/or to a display component via any type of audio and/or video connection or data link. In implementations, the audio system and/or the display system are integrated components of the example device 1100. Alternatively, the audio system and/or the display system are external, peripheral components to the example device.

Although implementations of managing quickview content for a multi-display device have been described in language specific to features and/or methods, the appended claims are not necessarily limited to the specific features or methods described. Rather, the specific features and methods are disclosed as example implementations of managing quickview content for a multi-display device, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A multi-display device, comprising: a primary display screen to display digital image content; a secondary display screen to display quickview content; a content control module implemented at least partially in hardware and configured to: determine a context that indicates a characteristic of the digital image content displayed on the primary display screen; determine the quickview content to display on the secondary display screen based on the context of the digital image content displayed on the primary display screen; and initiate display of the quickview content on the secondary display screen.

Alternatively or in addition to the above described multi-display device, any one or combination of: one or more sensors to detect at least one individual in a region from which the secondary display screen is viewable; and the content control module configured to activate the secondary display screen based on the detection of the at least one individual. The one or more sensors used to detect the at least one individual includes one or more of a proximity sensor, an audio sensor, an imager of a camera device, or a thermal sensor. The context of the digital image content is predefined and the quickview content is preconfigured to correspond to the digital image content. The content control module is configured to obtain the quickview content as generated in a customizable media application. The context of the digital image content displayed on the primary display screen is a photographic context, and the quickview content is a visual indication that the multi-display device is in a camera mode to capture a digital photograph or video content. The context of the digital image content displayed on the primary display screen is a wireless phone communication context, and the quickview content is a visual indication of a priority level of the wireless phone communication. The context of the digital image content displayed on the primary display screen corresponds to a crowd context, and the quickview content is a representation of an emotional status of a user of the multi-display device in relation to the crowd context. The context of the digital image content displayed on the primary display screen is an event viewing context, and the quickview content is a visual indication conveying information about an event in relation to the event viewing context.

A method, comprising: displaying digital image content on a primary display screen of a multi-display device; detecting at least one individual in a region from which a secondary display screen of the multi-display device is viewable; activating the secondary display screen in response to the at least one individual being detected in the region from which the secondary display screen is viewable; determining a context of the digital image content displayed on the primary display screen; determining quickview content to display on the secondary display screen based on the context of the digital image content; and displaying the quickview content on the secondary display screen.

Alternatively or in addition to the above described method, any one or combination of: the context of the digital image content displayed on the primary display screen is a photographic context, and the quickview content is a visual indication that the multi-display device is in a camera mode to capture a digital photograph. The context of the digital image content is predefined and the quickview content is preconfigured to correspond to the digital image content. The method further comprising obtaining the quickview content as generated in a customizable media application. The method further comprising deactivating the secondary display screen responsive to a determination that no individual is detected in the region from which the secondary display screen is viewable. The context of the digital image content displayed on the primary display screen is an event viewing context, and the quickview content is a visual indication conveying information about an event in relation to the event viewing context. The context of the digital image content displayed on the primary display screen is a wireless communication context, and the quickview content is a visual indication of a priority level of the wireless communication.

A method, comprising: displaying digital image content on a primary display screen of a multi-display device; detecting an environmental context of the multi-display device based on sensor data obtained from one or more sensors; determining a context of the digital image content displayed on the primary display screen; determining quickview content to display on a secondary display screen of the multi-display device based on the environmental context and the context of the digital image content displayed on the primary display screen; and displaying the quickview content on the secondary display screen.

Alternatively or in addition to the above described method, any one or combination of: detecting one or more individuals located in a viewable region of the secondary display screen; and activating the secondary display screen in response to the one or more individuals being detected in the viewable region. The environmental context is a crowd context, and the quickview content is a representation of an emotional status of a user of the multi-display device in relation to the crowd context. The environmental context is a crowd context; the context of the digital image content displayed on the primary display screen is a customizable media sharing application; and the quickview content displayed on the secondary display screen is customized media obtained from the customizable media sharing application.

The invention claimed is:

1. A multi-display device, comprising:
 a primary display screen to display digital image content;
 a secondary display screen to display quickview content; and
 a content control module implemented at least partially in hardware and configured to:
  determine a context that indicates a characteristic of the digital image content displayed on the primary display screen, the context indicating playback of digital content that depicts an event;
  determine the quickview content to display on the secondary display screen, the quickview content including a graphic that includes information about the event depicted by the digital content; and
  initiate display of the quickview content on the secondary display screen.

2. The multi-display device as described in claim 1, further comprising:
 one or more sensors to detect at least one individual in a region from which the secondary display screen is viewable; and
 the content control module configured to activate the secondary display screen based on the detection of the at least one individual.

3. The multi-display device as described in claim 2, wherein the one or more sensors used to detect the at least one individual includes one or more of a proximity sensor, an audio sensor, an imager of a camera device, or a thermal sensor.

4. The multi-display device as described in claim 1, wherein the context of the digital image content is predefined and the quickview content is preconfigured to correspond to the digital image content.

5. The multi-display device as described in claim 1, wherein the content control module is configured to obtain the quickview content as generated in a customizable media application.

6. A method, comprising:
- displaying digital image content on a primary display screen of a multi-display device;
- detecting at least one individual in a region from which a secondary display screen of the multi-display device is viewable;
- activating the secondary display screen in response to the at least one individual being detected in the region from which the secondary display screen is viewable;
- determining a context of the digital image content displayed on the primary display screen as a wireless communication context including a wireless communication between the multi-display device and at least one remote wireless device;
- determining quickview content to display on the secondary display screen, the quickview content including a text-based graphic indicating a priority level of the wireless communication; and
- displaying the quickview content on the secondary display screen.

7. The method as described in claim 6, wherein the context of the digital image content is predefined and the quickview content is preconfigured to correspond to the digital image content.

8. The method as described in claim 6, further comprising: obtaining the quickview content as generated in a customizable media application.

9. The method as described in claim 6, further comprising: deactivating the secondary display screen responsive to a determination that no individual is detected in the region from which the secondary display screen is viewable.

10. A method, comprising:
- displaying digital image content on a primary display screen of a multi-display device;
- detecting a number of individuals located in a viewable region of a secondary display screen of the multi-display device based on sensor data obtained from one or more sensors;
- determining an environmental context of the multi-display device based on the number of individuals in the viewable region;
- determining a context of the digital image content displayed on the primary display screen;
- determining quickview content to display on the secondary display screen of the multi-display device based on the number of individuals located in the viewable region and the context of the digital image content displayed on the primary display screen, the quickview content including a graphic that corresponds to an emotional status of a user of the multi-display device in relation to the environmental context; and
- displaying the quickview content on the secondary display screen.

11. The method as described in claim 10, further comprising:
- activating the secondary display screen in response to the detecting the number of individuals in the viewable region.

12. The method as described in claim 10, wherein:
- the environmental context is a crowd context;
- the context of the digital image content displayed on the primary display screen is a customizable media sharing application; and
- the quickview content displayed on the secondary display screen is an instance of customized media obtained from the customizable media sharing application.

13. The multi-display device as described in claim 1, wherein the graphic that includes information about the event depicted by the digital content includes how much time remains in the event.

14. The multi-display device as described in claim 1, wherein the digital content includes video content from a media streaming application.

15. The method as described in claim 6, wherein the priority level is based on stored information associated with a contact in a digital address listing of the multi-display device, the contact associated with the at least one remote wireless device.

16. The method as described in claim 15, wherein the stored information indicates that the contact associated with the at least one remote wireless device is predefined as a priority contact relative to one or more additional contacts in the digital address listing and the quickview content includes a message not to interrupt a user of the multi-display device.

17. The method as described in claim 15, wherein the stored information indicates that the contact associated with the at least one remote wireless device is not a priority contact relative to one or more additional contacts in the digital address listing and the quickview content includes a message that it is okay to interrupt a user of the multi-display device.

18. The method as described in claim 10, wherein the environmental context is determined to be a crowd context that indicates that the multi-display device is located in a crowd of individuals.

19. The method as described in claim 10, wherein the environmental context is determined to be a date context that indicates that the user of the multi-display device is on a date with an individual of the number of individuals.

20. The method as described in claim 10, wherein the environmental context is a solo context that indicates that there are no individuals in the viewable region.

* * * * *